Figure 1:
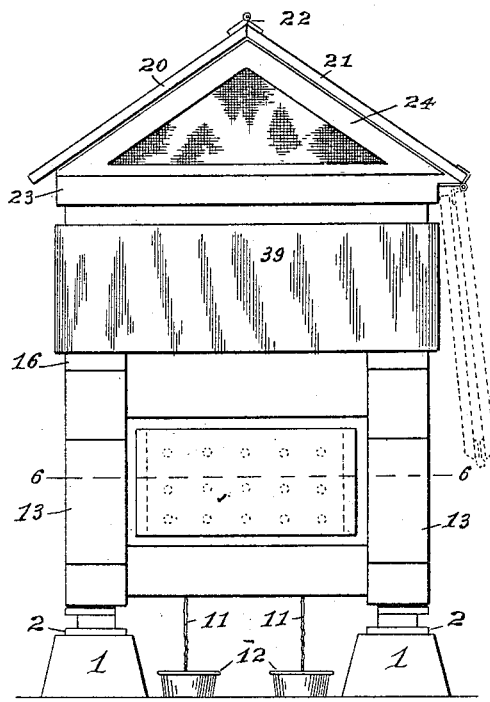

E. HAINS.
BEEHIVE.
APPLICATION FILED JULY 1, 1915.

1,211,145.

Patented Jan. 2, 1917.
2 SHEETS—SHEET 1.

Inventor
Edson Hains

By Norris P. Griswold.
Attorney

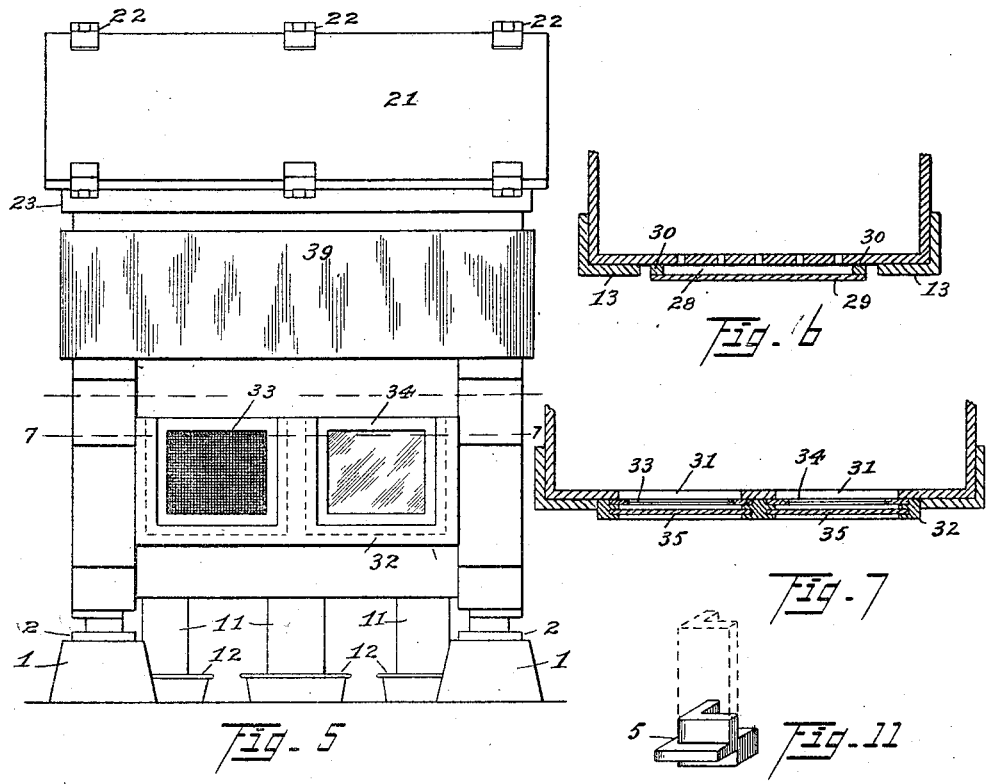
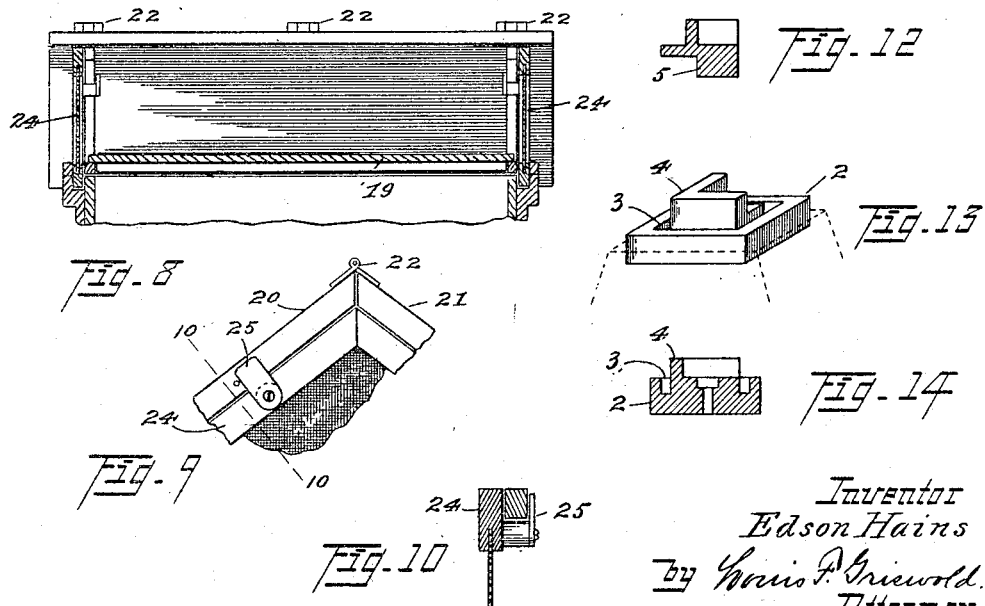

UNITED STATES PATENT OFFICE.

EDSON HAINS, OF BEDFORD, OHIO.

BEEHIVE.

1,211,145.  Specification of Letters Patent.  Patented Jan. 2, 1917.

Application filed July 1, 1915. Serial No. 37,554.

*To all whom it may concern:*

Be it known that I, EDSON HAINS, a citizen of the United States, residing at Bedford, in the county of Cuyahoga and State of Ohio, have invented a certain new and useful Improvement in Beehives, of which the following is a full, clear, and exact description, reference being had to the accompanying drawings, and to the reference characters marked thereon.

This invention relates to bee-hives and the accessories thereto.

Among the objects of the present invention are the provision of a durable, adjustable, portable hive that embodies numerous desirable features that make the home for the bees and the working conditions comfortable and convenient. A very important consideration in successful apiculture is the utilization of the bees to the utmost in gathering honey, by reducing to a minmum the waste of bee energy involved in keeping the hive well ventilated and at the proper temperature in all seasons, and furnishing comfortable working and living conditions, thereby creating contentment in the colony, lessening of the liability to swarm outside, and increasing the working capacity or efficiency of the bees.

The present invention provides easy access of the bees from one compartment to another, thereby facilitating the feeding of honey into sections out of other combs, as extracting combs, brood combs, chunk combs, etc. It provides overflow space, thereby preventing crowding into main apartment, as is often the case in large colonies, and giving the bees more liberty to scatter and relieve the brood nest of congestion. The colony is kept warmer in winter, quieter in spring, and cooler in summer, the bees are not compelled to crowd in hot weather into their winter quarters or cluster outside in a storm, or in hot sunshine, or in the open daylight for a longer time than is desirable. This has a tendency to contentment in the colony and lessens the liability of the acquired habit of swarming. Bees show appreciation of conditions and treatment, and if handled carefully, given comfortable and convenient quarters, and supplied with young quiet queens, the result is that very few, if any, swarms leave the hive, thereby causing less loss and trouble to the keeper.

A further object of the invention is the provision of means for readily inspecting or watching the working of the bees without disturbing the hive.

The invention also provides a well ventilated attic over the super and means for ready access to said attic and super without disturbance to other parts of the hive.

In view of the above and other objects that will be hereinafter disclosed, the invention consists in the construction, combination and arrangement of the parts as described in the following specification and pointed out definitely in the claims.

Figure 2:
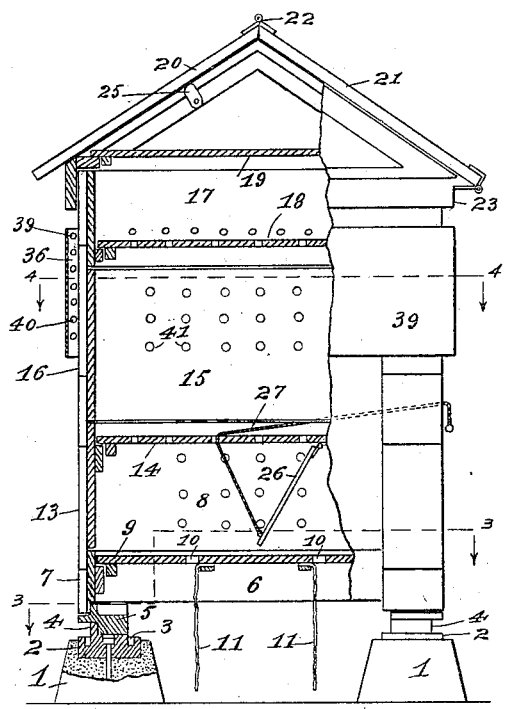
Figure 3:
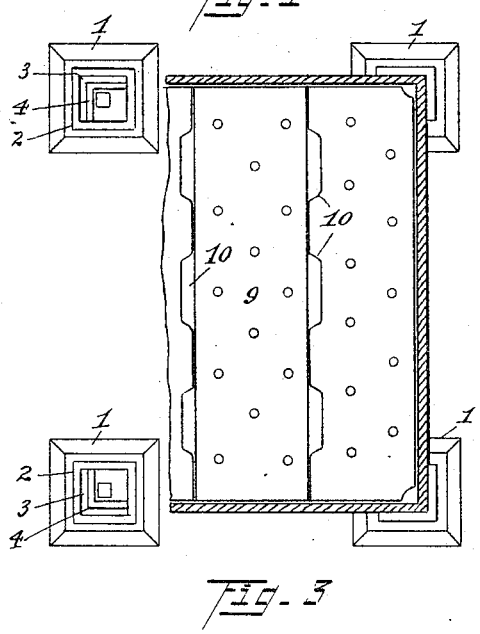
Figure 4:
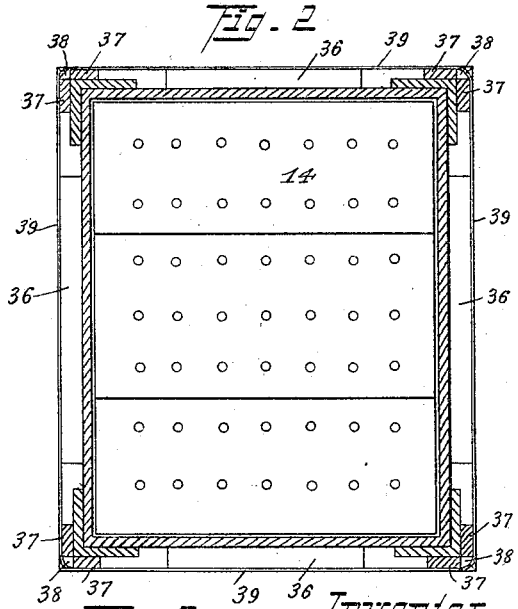

In the drawings forming a part of this specification Figure 1 is an end elevation of the improved bee-hive, and Fig. 2 is a similar view partially in central vertical section. Fig. 3 is a cross section on line 3—3 of Fig. 2. Fig. 4 is a cross section on line 4—4 of Fig. 2. Fig. 5 is a side elevation. Fig. 6 is a fragmentary section on line 6—6 of Fig. 1. Fig. 7 is a fragmentary section on line 7—7 of Fig. 5. Fig. 8 is a central vertical section through the gable and attic. Fig. 9 is an enlarged fragmentary end view of the gable. Fig. 10 is a section on line 10—10 of Fig. 9. Fig. 11 is a perspective view of a supporting shoe, and Fig. 12 is a section through said shoe. Fig. 13 is a perspective of a foundation plate, and Fig. 14 is a section through said plate.

Throughout the drawings and specification similar characters of reference are employed to designate similar parts.

As a bee-hive is exposed to all kinds and conditions of weather, it is essential that it be of substantial construction and have a firm foundation, and as it is frequently desirable to change the location of the hive, I provide portable foundation members 1 which are preferably made of concrete having a member 2 embedded in the top thereof. The member 2 is provided with a channel 3 adapted to contain water or other suitable liquid to repel ants or other insects, or in case the member 2 is made of wood, the channel may contain a preservative solution. The member 2 is also provided with a vertical corner flange 4. Detachable members 5 are adapted to nest in the members 2, these members 5 may be short as shown in the several figures of the drawings, or they may be provided in series of various lengths, one of which is indicated by broken lines in Fig. 11. By this arrangement the hive may be adjusted to various heights, the members 5 forming supporting legs. This is a very advantageous feature, as it frequently occurs that increased space is desired below the basement story for the insertion of a foreign swarm of bees to be coerced into the hive above, or it may be advisable to elevate the hive on account of moisture, invasion by mice or for other reasons. The legs 5 being independent members make it possible to readily elevate the hive as a whole, without disarranging the parts or disturbing the contents.

A sub-basement member 6 is provided with outboards 7 on all four corners, and is adapted to rest on the tops of the supporting members 5, the outboards 7 overlapping said members 5 as shown. Above the sub-basement 6 is the basement proper, or brood chamber 8 provided with a detachable bottom 9, said bottom having perforations 10 therein and strips of cloth or wicks 11 depending therefrom. The wicks 11 depend into water receptacles 12 and serve as combined water conveyers and ladders for the bees. The basement member 8 is also provided with outboard corners 13 adapted to overlap the sub-basement member 6. A detachable perforated basement ceiling 14 is provided, the said ceiling forming a floor for the working and storage chamber 15 which is situated directly above the brood chamber 8 and is provided with outboard corners 16 which overlap the brood chamber member. The super 17 situated directly above the storage chamber 15 is likewise provided with outboard corners which overlap said storage chamber. The super has a perforated detachable bottom 18. Above the super is an attic having a removable floor 19 and covered by a gable roof, the two members 20 and 21 of which are attached to each other by hinges 22 on the ridge, the member 21 being in turn hinged to the frame 23 which overlaps the super 17. The gable ends of the attic are provided with framed screens 24 which are held in place by turn buttons 25 and may be readily removed and replaced by solid closure members when weather conditions justify same. The attic thus formed provides a convenient storage room for small tools and supplies, and having the double hinged roof, makes it easily accessible without disturbing the other parts of the hive. The hinged roof and the removable attic floor also provides ready access to the super without other disturbance.

A draw-bridge or ladder 26 is hinged to the underside of the floor member 14 and provides convenient means of travel for the bees from the brood chamber 8 to the working chamber 15. The ladder 26 is raised and lowered from the outside of the hive by a cord or chain 27.

An overflow chamber 28 is formed at each end of the brood chamber 8 by members 29 and spacer strips 30 attached to the exterior of the walls of said chamber 8. The side walls of the brood chamber are provided with openings 31, and around these openings is arranged a frame 32 provided with grooves for the insertion of screen frames 33 or window frames 34 for the purposes of ventilation or inspection. Provision is also made in the frame 32 for the insertion of blinder members 35 in case it is desired to entirely close the openings.

Entirely surrounding the working and storage chamber 15 is an overflow chamber 36, constructed as follows: Attached to the exterior corners of the chamber are vertical strips 37, vertical corner openings 38 being allowed between said strips. Stretched taut around the hive over the corner strips 37 is a cloth envelop member 39. The strips 37 are provided with perforations 40, thereby allowing the bees the freedom of the entire overflow chamber and permitting them to pass from said overflow into the super. Openings 41 are provided from the working chamber into the overflow 36, and openings from the super 17 into the overflow 36. The overflow chamber, as shown in the drawings extends only over a portion of the working chamber and the super, but it will be understood that it can be extended vertically and made to envelop the entire work chamber, super, and broodchamber, allowing freedom of access from the overflow chamber to substantially all apartments of the hive. It is desirable to make the enveloping member of cloth as the bees can cling thereto and travel freely over all parts, and it also makes the chamber light and comfortable. As a protection from extreme heat or cold an outer covering of more or less heavy paper may be provided.

The improved hive and subsidiary devices hereinbefore described, aims to increase the facility of labor, thereby increasing the honey production, and at the same time decreasing the bee-keeper's losses and troubles.

What I claim and desire to secure by Letters Patent is—

1. In a beehive, the combination of foundation members; detachable legs supported by said foundation members; a sub-basement member supported on the legs and provided with corner outboards which overlap said legs; a brood chamber above the sub-basement and having corner out-boards which overlap the exterior corners of the sub-basement member; a storage chamber above the brood chamber and having corner outboards which overlap the exterior corners of the brood chamber; a super above the storage chamber, corner out-boards on said super which overlap the exterior corners of the storage chamber; and an attic above said super.

2. In a beehive, a brood chamber elevated and supported on foundation members, the floor of said brood chamber having openings therein, strips of fabric attached to the underside of said floor and depending therefrom for the purpose set forth.

3. In a beehive, the combination of a brood chamber; and overflow chambers outside the brood chamber and entrances from the overflow chamber to said brood chamber.

4. In a beehive, the combination of a brood chamber having openings in two opposite sides thereof; interchangeable screens, windows, and closure members for covering said openings; overflow chambers arranged on the exterior of the other two sides of the brood chamber, and openings from the overflow chambers into the brood chamber.

5. In a beehive, the combination of a brood chamber having openings in two opposite sides thereof; interchangeable screens, windows, and closure members for covering said openings; overflow chambers arranged on the exterior of the other two sides of the brood chamber; a detachable floor in said brood chamber having openings therein; strips of fabric attached to the underside of said floor in juxtaposition to said openings and depending therefrom; and a sub-basement member below the brood chamber.

6. In a beehive, the combination of a brood chamber; a detachable floor in said brood chamber, said floor having openings therein; strips of fabric depending from the underside of said floor; a sub-basement below the brood chamber; a storage chamber above the brood chamber; a detachable floor having openings therein, in the storage chamber; a draw-bridge in the brood chamber; means for raising and lowering said draw-bridge; an overflow chamber on the exterior of the storage chamber and having entrances to said storage chamber.

7. In a beehive, the combination of a brood chamber; a detachable floor in said brood chamber, said floor having openings therein; strips of fabric depending from the underside of said floor; a sub-basement below the brood chamber; a storage chamber above the brood chamber; a detachable floor having openings therein, in the storage chamber; a draw-bridge in the brood chamber; means for raising and lowering said draw-bridge; an overflow chamber on the exterior of the storage chamber; a super above the storage chamber; a detachable floor in said super, said super and storage chambers having entrances therefrom into the overflow chamber.

8. In a beehive, a storage chamber, vertical spacing members attached to the exterior corners of the walls of said storage chamber, an intervening space between said spacing members, transverse openings in the spacing members connecting with the said intervening space, a fabric enveloping member circumscribing the storage chamber outside the spacing members thereby forming an overflow chamber, and entrances from said overflow chamber to the storage chamber.

9. In a beehive, a storage chamber, vertical spacing members attached to the exterior corners of the walls of said storage chamber, an intervening space between said spacing members, transverse openings in the spacing members communicating with the intervening space, a fabric enveloping member circumscribing the storage chamber outside the spacing members, and a secondary enveloping member outside said fabric enveloping member thereby forming an overflow chamber and a protection therefor, and entrances from said overflow chamber to the storage chamber.

10. In a beehive, the combination of the storage chamber, the super located above said storage chamber, an overflow chamber circumscribing the storage chamber and super, the walls of the storage chamber and super being provided with openings into said overflow chamber.

11. In a beehive, the combination of a super, an attic above said super, a removable floor in said attic, removable end wall members in the attic, and means for retaining said end walls in position.

12. In a beehive, the combination of a super, an attic above said super, a removable floor in said attic, and interchangeable screen frames and closure members for insertion in the ends of said attic.

13. In a beehive, an attic located above the super, a removable floor in said attic, a gable roof over said attic, said roof consisting of two oppositely inclined members hinged to each other at the ridge, a frame circumscribing the super, the lower edge of one of the roof members being hinged to said frame.

EDSON HAINS.

Witness:
L. F. GRISWOLD.

Copies of this patent may be obtained for five cents each, by addressing the "Commissioner of Patents, Washington, D. C."